United States Patent [19]

Nakae et al.

[11] Patent Number: 5,299,432
[45] Date of Patent: Apr. 5, 1994

[54] CONTROL DEVICE FOR AIR CONDITIONER

[75] Inventors: Tsugio Nakae; Tomonori Isobe, both of Gunma; Manabu Ishihara, Isesaki, all of Japan

[73] Assignee: Sanyo Electric Co., Ltd., Osaka, Japan

[21] Appl. No.: 922,470

[22] Filed: Jul. 29, 1992

[30] Foreign Application Priority Data

Dec. 19, 1991 [JP] Japan .................................. 3-354577

[51] Int. Cl.$^5$ ............................................. F25D 19/00
[52] U.S. Cl. .................................................... 62/298
[58] Field of Search ................ 62/231, 157, 126, 127, 62/129, 298; 236/51; 165/12

[56] References Cited

U.S. PATENT DOCUMENTS

| | | | |
|---|---|---|---|
| 4,381,549 | 4/1983 | Stamp, Jr. et al. | 62/126 |
| 4,539,632 | 9/1985 | Hansen et al. | 62/127 X |
| 4,545,210 | 10/1985 | Lord | 62/231 X |
| 4,574,871 | 3/1986 | Parksinson et al. | 62/231 X |
| 4,795,088 | 1/1989 | Kobayashi et al. | 62/298 X |
| 4,898,230 | 2/1990 | Tsuchiyama et al. | 165/12 |
| 5,005,366 | 4/1991 | Murashige | 62/126 |
| 5,115,643 | 5/1992 | Hayata et al. | 62/126 |

*Primary Examiner*—Harry B. Tanner
*Attorney, Agent, or Firm*—Rogers, Howell & Haferkamp

[57] ABSTRACT

This invention aims to facilitate setting and modifications of characteristic data for microcomputers used for control of various types of air conditioner. A control device for the air conditioner comprises a microcomputer having a first ROM for storing a program for controlling operations of a compressor and a blower, a RAM for storing present data and various data associated with the operations and a CPU for executing the program. A second ROM is provided in the control device for storing specific data representing capacity of the components such as compressors and a blower, functions of the air conditioner, exclusive cooling or cooling/heating and so on.

19 Claims, 5 Drawing Sheets

CONTROL DEVICE FOR AIR CONDITIONER

BACKGROUND OF THE INVENTION

1. Field of the Invention

The present invention relates to a control device for an air conditioner.

2. Description of the Prior Art

Recently, air conditioners for conditioning the temperature, humidity, or ventilation of the interior of offices, houses, and vehicles are widely used. For example, a home air conditioner has a variety of functions for detecting an outdoor or room temperature, controlling the blowing air temperature or air quantity so that the room temperature reaches a desired value as soon as possible, controlling the operating speed to obtain a cooling/heating capability in accordance with the request of a user, adjusting the flowing direction of the cool or warm air, blowing the cool or warm air with a minimum wait time when necessary, and the like. Hence, various types of air conditioners having different functions in accordance with the requests of the user have been developed.

Control of an air conditioner is usually performed by a microcomputer. To provide various types of air conditioners, microcomputers for exclusive use in which data (hereinafter referred to as "specific data") concerning functions, capacities, and characteristics of respective types are built-in have been put into practical use (e.g., see Japanese Patent Laid-Open No. 3-91644). The number of different types of air conditioners has increased as there has been a variety of desires of users, and currently several tens of types of air conditioners are now on the market when home air conditioners are taken as an example. However, it is not advisable from a design viewpoint, to manufacture microcomputers for meeting separately the different functions and capacities for each of these different types, as it results in increased cost for each microcomputer.

SUMMARY OF THE INVENTION

The present invention has been made in view of the above situation, and has as its object to facilitate setting and modifying characteristic data for microcomputers for various types of air conditioners and to enhance availability of a microcomputer circuit board, thereby decreasing the cost for a microcomputer.

According to the present invention, there is provided, in an air conditioner having a refrigeration cycle in which a compressor, an outdoor heat exchanger, an expansion valve, and an indoor heat exchanger are connected by a refrigerant pipe for supplying air which is temperature-controlled by the indoor heat exchanger to a room to be air-conditioned by controlling components, such as the compressor and a blower, a control device for controlling the components of the air conditioner, comprising: a microcomputer including in one package a first ROM for storing a program for controlling operations of the components, a RAM for storing present data and various data associated with operations, and a CPU for executing the program; and a second ROM for storing specific data representing at least capacities of the respective components and sequentially outputting the stored specific data to the microcomputer in response to an output from the microcomputer, said second ROM being electrically connected to said microcomputer, wherein the CPU stores the specific data output from the second ROM in accordance with the program into said RAM and starts control of the components on the basis of the data stored in the RAM.

According to the present invention, there is provided, in an air conditioner of separate type comprising an indoor unit including an expansion valve and an indoor heat exchanger and an outdoor unit including a compressor and an outdoor heat exchanger, a control device being provided for each of said indoor unit and said outdoor unit and comprising: a microcomputer housing in one package a first ROM for storing a program for controlling operation of components such as said compressor and a blower, a RAM for storing present data and various data associated with operations, and a CPU for executing said program; and a second ROM for storing specific data representing at least capacities of said respective components and for sequentially outputting said stored specific data to said microcomputer in response to an output from said microcomputer, said second ROM being electrically connected to said microcomputer, wherein said CPU stores said specific data output from said second ROM in accordance with said program into said RAM and starts control of said components in said indoor and outdoor units on the basis of said data in said RAM.

With the control device as described above, operation control in accordance with the function of the airconditioner and the capability of the compressor or air blower can be performed by using the second ROM storing specific data representing the function of the air conditioner and the capability of the compressor, blower, or the like to be incorporated in the air conditioner.

Various air conditioners with different functions and capacities and with different compressors and air blowers incorporated therein can be controlled by control devices of the same type only by exchanging the second ROM.

DETAILED DESCRIPTION OF PREFERRED EMBODIMENT

A preferred embodiment of the present invention will be described with reference to the accompanying drawings.

Figure 1:
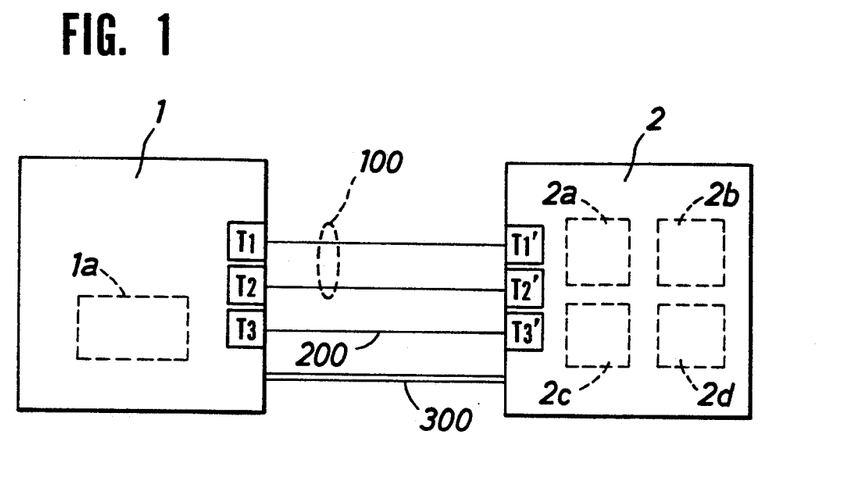
FIG. 1 is a view showing electrical connection between the control circuits of indoor and outdoor units of an air conditioner according to the present invention.

An air conditioner is constituted by a unit (hereinafter referred to as "indoor unit") 1 disposed indoors and a unit (hereinafter referred to as outdoor unit) 2 disposed outdoors. The units 1 and 2 are connected through power lines 100 and a communication or signal line 200.

An indoor heat exchanger 1a is incorporated in the indoor, unit 1, and an outdoor heat exchanger 2a, a compressor 2b, a powered expansion valve 2c, and a four-way valve 2d are incorporated in the outdoor unit 2. These constituent elements are connected through a refrigerant pipe 300 to constitute a refrigeration cycle.

Figure 2:
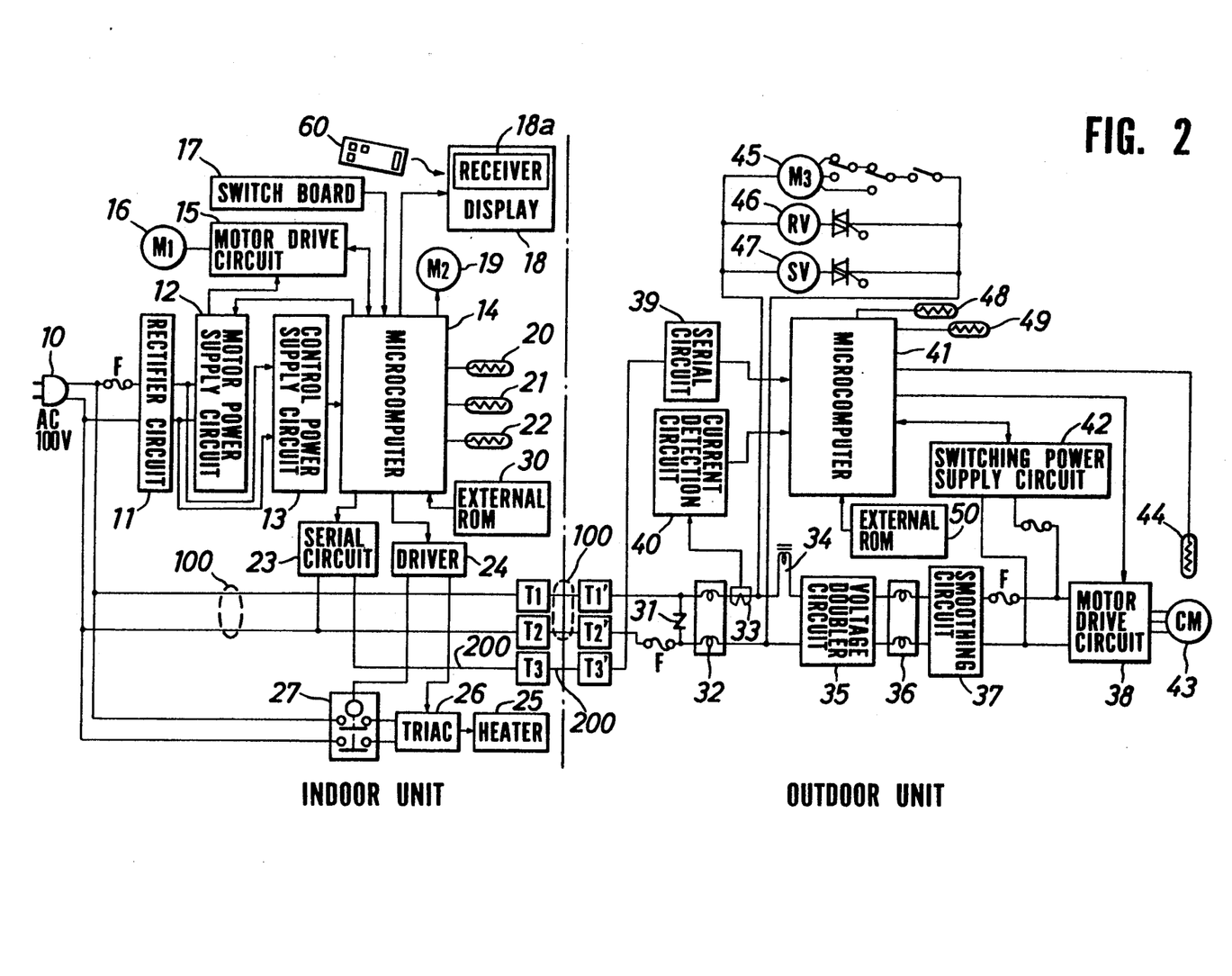
FIG. 2 is a block diagram showing the control circuit of the air conditioner.

FIG. 2 shows the control circuit of the air conditioner according to the present invention. The circuit portion on the left side of a dashed line drawn at the central portion in FIG. 1 is a control circuit provided in the indoor unit 1, and the circuit portion on the right side of the same line is a control circuit provided in the outdoor unit 2. These control circuits are connected through the power lines 100 and the communication line 200.

The control circuit of the indoor unit 1 has a rectifier circuit 11, a motor power supply circuit 12, a control power supply circuit 13, a microcomputer 14, a motor-drive circuit 15, a DC fan motor (brushless motor) (M1) 16, a switch board 17, a receiver 18a, a display 18, rectifies AC 100 V supplied from a plug 10. The motor power supply circuit 12 converts the voltage to DC power to be applied to the DC fanmotor 16, which flows cool or warm air into a room, to 10 to 36 V in response to a signal from the microcomputer 14. The control power supply circuit 13 generates DC power of 5 V for the microcomputer 14. The motor drive circuit 15 controls an energization timing of a stator winding of the DC fan motor 16 in response to a signal from the microcomputer 14. An ON/OFF switch, a test run switch, and the like provided on an operation panel of the indoor unit 1 are mounted on the switch board 17. The receiver 18a receives a remote control signal (an ON/OFF signal, a cooling/heating switching signal, or a room temperature present value signal) from a wireless remote controller 60. The display 18 displays the operating state of the air conditioner. The flap motor 19 moves a flap for changing the blowing direction of the cool/hot air.

The control circuit of the indoor unit 1 also has a room temperature sensor 20 for detecting room temperature, a temperature sensor 21 for detecting temperature of the indoor heat exchanger 1a, and a humidity sensor 22 for detecting humidity in the room. Detection values of these sensors are A/D-converted and fetched by the microcomputer 14. A control signal is transmitted from the microcomputer 14 to the outdoor unit 2 through a serial circuit 23 and a terminal board T3. A TRIAC 26 and a heater relay 27 are controlled by signals from the microcomputer 14 through a driver 24 to phase-lock energization of a re-heater 25 in the dehumidification mode.

Reference numeral 30 denotes an external ROM for storing the "specific data" that specify the type and various characteristics of the air conditioner. The specific data stored in the external ROM (auxiliary ROM) 30 include:

(1) indoor unit or outdoor unit
(2) Year of in development
(3) record on change in development
(4) large size or small size
(5) serial manufacturing number
(6) type of corresponding remote controller
(7) exclusive cooling or cooling/heating
(8) with or without heater and humidity sensor
(9) capacity of heat exchanger
(10) with or without remote control address
(11) rated heating and cooling frequencies
(12) maximum heating frequency (e.g., 105 to 180 Hz)
(13) angular position of flap
(14) swing ranges of flap in cooling and heating. modes
(15) maximum rpm for voltage control of fan motor
(16) data check code These specific data are read out from the external ROM 30 immediately after the power switch is turned on and immediately after the operation is stopped. When the power switch is turned on, no command is supplied from the wireless remote controller 60, and the states of the operation and test run switches (to be described later) are not detected until readout of the specific data from the external ROM 30 is completed.

The control circuit of the outdoor unit 2 will be described.

The outdoor unit 2 has terminal boards $T_1'$, $T_2'$, and $T_3'$ respectively connected to terminal boards $T_1$ and $T_2$ and the terminal board T3 of the indoor unit 2. Reference numeral 31 denotes a varistor connected in parallel to the terminal boards $T_1'$ and $T_2'$; 32, a noise filter; 34, a reactor; 35, a voltage doubler circuit; 36, a noise filter; and 37, a smoothing circuit for smoothing the double voltage generated by the voltage doubler circuit 35. A DC voltage of about 280 V can be obtained from an AC voltage of 100 V.

Reference numeral 39 denotes a serial circuit for performing signal conversion to transmit a control signal from the indoor unit 1, which is input through the terminal board $T_3'$, to a microcomputer 41. Reference numeral 40 denotes a current detection circuit for detecting a current supplied to the load of the outdoor unit 2 by a current transformer (CT) 33, smoothing the transformed current to a DC voltage, and supplying the DC voltage to the microcomputer 41. Reference numeral 41 denotes the microcomputer; and 42, a switching power supply circuit for generating a power supply voltage for the microcomputer 41. Reference numeral 38 denotes a motor drive circuit for PWM-controlling the power supply to a compressor motor 43 (to be described later) in accordance with the control signal from the microcomputer 41. In the motor drive circuit 38, six power transistors are connected to form a three-phase bridge to constitute a so-called inverter unit. Reference numeral 43 denotes the compressor motor for driving the compressor of the refrigeration cycle; 44, a discharge temperature sensor for detecting the temperature of the refrigerant on the discharge side of the compressor; 45, a fan motor speed-controlled to three speeds to supply air to the outdoor heat exchanger 2a. Reference numerals 46 and 47 denote a four-way valve and a solenoid valve, respectively, for switching the flow path of the refrigerant in the refrigeration cycle.

The outdoor unit 2 also has an outer air sensor 48 for detecting the temperature of the outer air provided in the vicinity of the air intake port, and a heat exchanger temperature sensor 49 for detecting the temperature of the outdoor heat exchanger 2a. The detection values from the sensors 48 and 49 are A/D-converted and fetched by the microcomputer 41.

Reference numeral 50 denotes an external ROM having the same function as that of the external ROM 30 of the indoor unit 1. The external ROM 50 stores specific data for the outdoor unit 2 which are similar to those described regarding the external ROM 30. Examples of the specific data are those stored in the external ROM 30 as numbered (1) to (8), (11), (12) and (15) and additionally are capacity of the compressor and defrosting data such as defrosting time.

Reference symbols F indicated in the control circuits of the indoor and outdoor units 1 and 2 denote fuses.

The microcomputer 14 or 41 as a control element is Model U879JP (manufactured by Intel Corp.) in which a ROM storing a startup program, a RAM for storing reference data, and a CPU for executing the program are mounted in one package.

Figure 3:
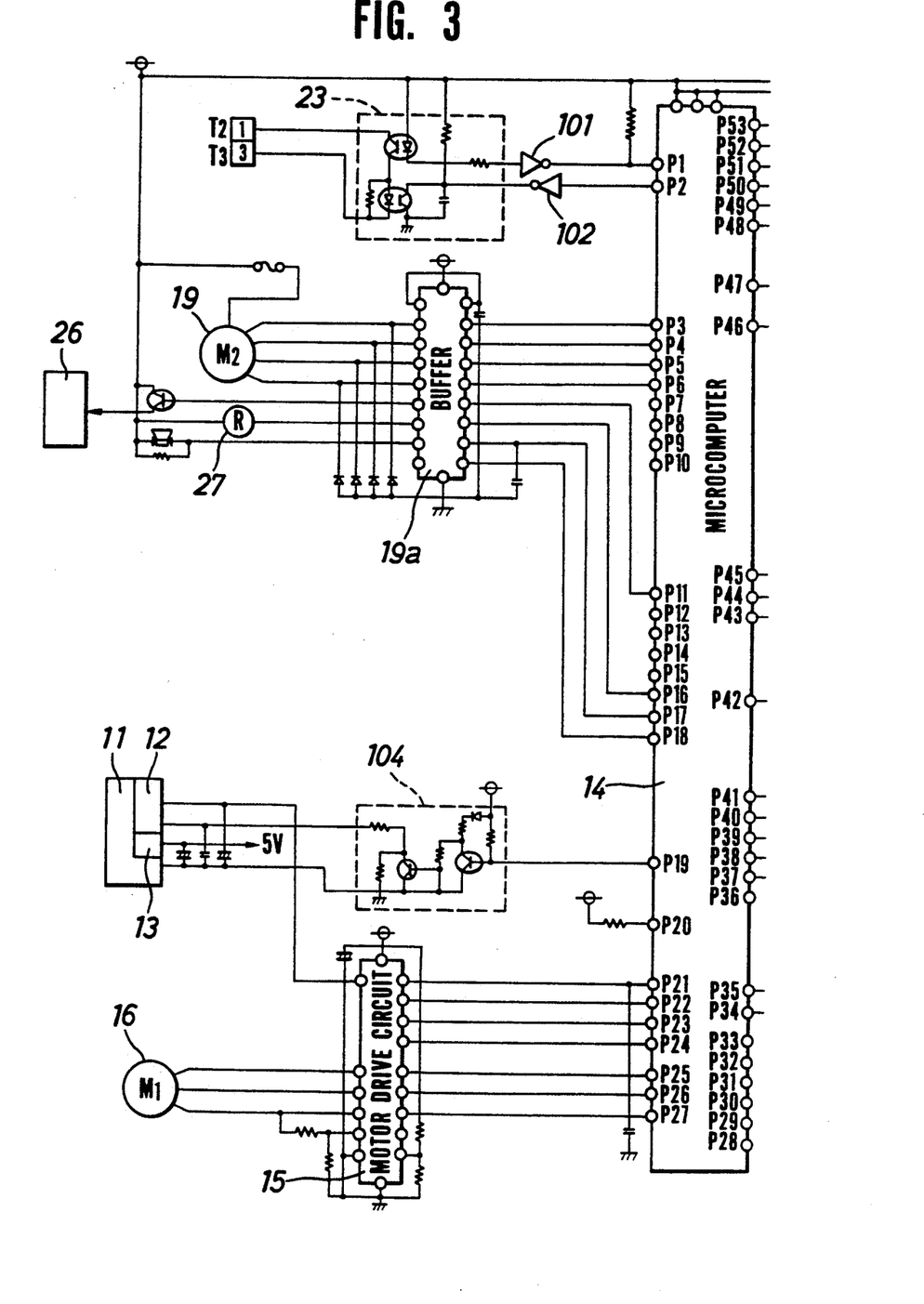
FIG. 3 is an actual wiring diagram of a part of the control circuit shown in FIG. 2.
Figure 4:
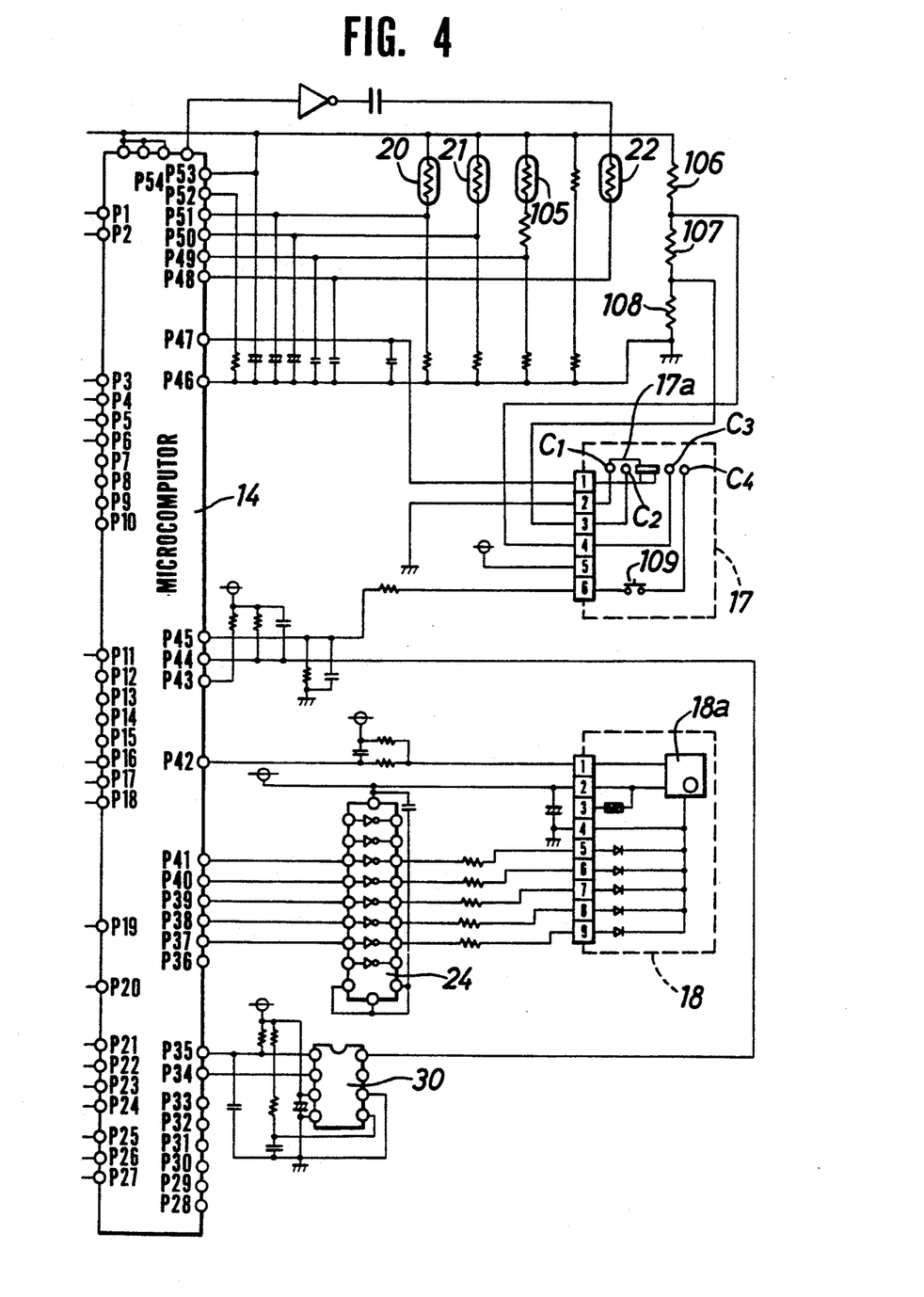
FIG. 4 is an actual wiring diagram of the remaining part of the control circuit shown in FIG. 2.

FIGS. 3 and 4 show actual wiring diagrams of the microcomputer 14 in the control circuit of the indoor unit among the electrical circuits of the air conditioner shown in FIG. 1. FIG. 3 shows wiring of the left half of the microcomputer 14, and FIG. 4 shows wiring of the right half of the microcomputer 14. FIGS. 3 and 4 form the overall portion of the actual wiring diagram when combined. The same reference numerals as in FIG. 2 denote the same constituent components.

Referring to FIG. 3, the microcomputer 14 outputs control data to be supplied to the outdoor unit 2 through its port P1 to be supplied to the serial circuit 34 through a buffer 101. The serial circuit 23 outputs the control data to the signal line 200 connecting the indoor and outdoor units 1 and 2. To receive the control data from the outdoor unit 2, the microcomputer 14 receives the control data from its port P2 through the communication line 200, the serial circuit 23, and a buffer 102. The serial circuit 23 exchanges the control data between the communication line 200 and the buffers 101 and 102 by using a photocoupler.

Output ports P3 to P6 output drive signals for the flap motor 19. A stepping motor is used as the flap motor 19 and can change the angle of rotation of the flap motor 19 by energizing the coils of the flap motor 19 by the signals output from the output ports P3 to P6. The signals output from the ports P3 to P6 are power-amplified by a buffer 19a to such a degree to energize the coils of the flap motor 19.

An output port P11 outputs a turn-on signal for the TRIAC 26, the output port P17 outputs a signal for controlling energization of the heater relay 27, and the output port P18 outputs a signal for energizing a buzzer 103. These signals are power-amplified by the buffer 19a.

An output port P19 outputs a DC voltage signal to be applied to the fan motor 16. The signal of the DC voltage is constituted by pulse trains having pulse widths with different duty ratio. This pulse train is converted to a DC voltage by a converter circuit 104. The DC voltage is supplied to the motor power supply circuit 12. The motor power supply circuit 12 supplies a DC power having a voltage corresponding to this DC voltage to the motor drive circuit 15. Hence, the voltage to be supplied to the motor drive circuit 15 can be changed by changing the duty ratio of the pulse train output from the port P19. Since a DC brushless motor is used as the fan motor 16, as will be described later, the speed of the fan motor 16 can be changed by changing the voltage to be applied to the motor drive circuit 15.

The converter circuit 104 is mainly constituted by a transistor, a resistor and a smoothing capacitor.

A signal for controlling energization timing of the fan motor (three-phase brushless motor) 16 is input to the microcomputer 14 through an input port P21. This signal is obtained when the polarity of the current flowing through the stator wirings of the three-phase brushless motor changes at the neutral point, and six signals are obtained by one rotation of the motor. A circuit for obtaining this signal is incorporated in the motor drive circuit 15 (hybrid ICKA160 manufactured by Sanyo Electric Co., Ltd.). The motor drive circuit 15 also incorporates an inverter circuit in which six power transistors are connected to form a three-phase bridge, and a switching circuit (mainly a circuit for shortening the discharge time of the charges accumulated in the base-emitter paths of the power transistors) for turning on/off these power transistors at a high speed.

Accordingly, the fan motor 16 can be driven by sequentially turning on/off the power transistors in accordance with the angles of rotation of the motors with predetermined combination of on/off operations. The on/off signals of the respective power transistors based on the combinations of the on/off operations are output through output ports P22 to P27 of the microcomputer 14.

The microcomputer 14 performs a predetermined arithmetic operation using the signal (i.e. the time between two signals) input through the port P21 to determine the angles of rotation of the rotors, and outputs on/off signals corresponding to this angle of rotation to the motor drive circuit 15 through the ports P22 to P27.

Referring to FIG. 4, an output of the temperature sensor 20 is input to a port P51, an output of the heat exchanger temperature sensor 21 is input to a port P50, an output from a brightness detection sensor 105 (CdS) is input to a port P49, and an output from the humidity sensor 22 is input to a port P48 of the microcomputer 14. These outputs are A/D (analog/digital)-converted by the ports P51, P50, P49, and P48 and stored in the RAM in the microcomputer as data. Contacts $C_1$ to $C_4$ for allowing full-stop, operation, test run, failure diagnosis, and the like are provided on the switch board 17, and a slider or switch 17a is moved left and right by a manual operation. Four levels of different potentials are applied to the contacts C1 to C4 by the resistors 106 to 108 and a voltage of 5 V. Hence, a contact contacting the slider 17a can be discriminated by discriminating the potential at an input port P47 (A/D conversion input port). A failure diagnosis switch 109 is connected to the port P45 of the microcomputer 14. A remote control signal received by the receiver 18a is input to the microcomputer 14 through a port P42, and signals for turning on a light-emitting diode 18b indicating operation, automatic cooling, automatic heating, and dehumidification is output from ports P36 to P41 to the display 18.

The external ROM 30 is connected to ports P34, P35, and P44 of the microcomputer 14, and the microcomputer 14 reads out the specific data stored in the ROM 30 as required.

Figure 5:
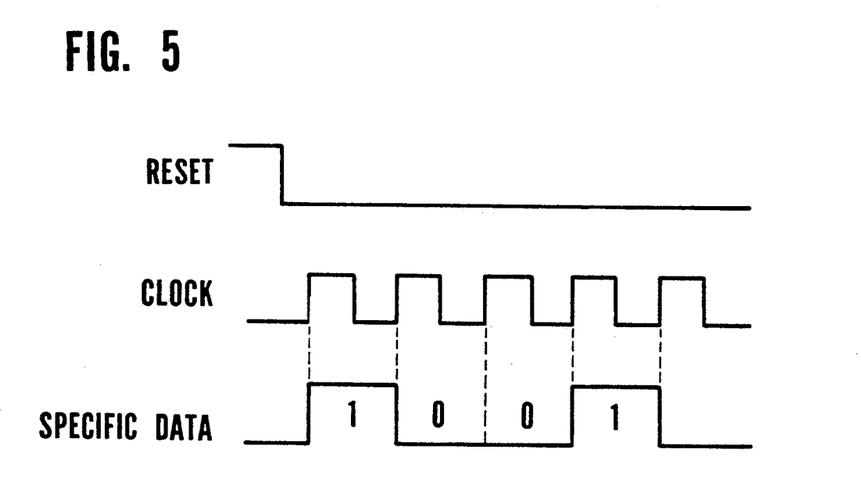
FIG. 5 is a timing chart showing a readout timing of specific data from an externally mounted ROM used in the present invention.

To read out the specific data, the microcomputer 14 resets the external ROM 30 by a signal output through the port P34, as shown in FIG. 5, thereafter outputs a clock through the port P35, inputs the data through the port P44 in response to the clock, and stores the data in the internal ROM. As the external ROM 30, a one time programmable sequential read only memory, e.g., model MB85419P manufactured by FUJITSU, LTD. is used.

Figure 6:
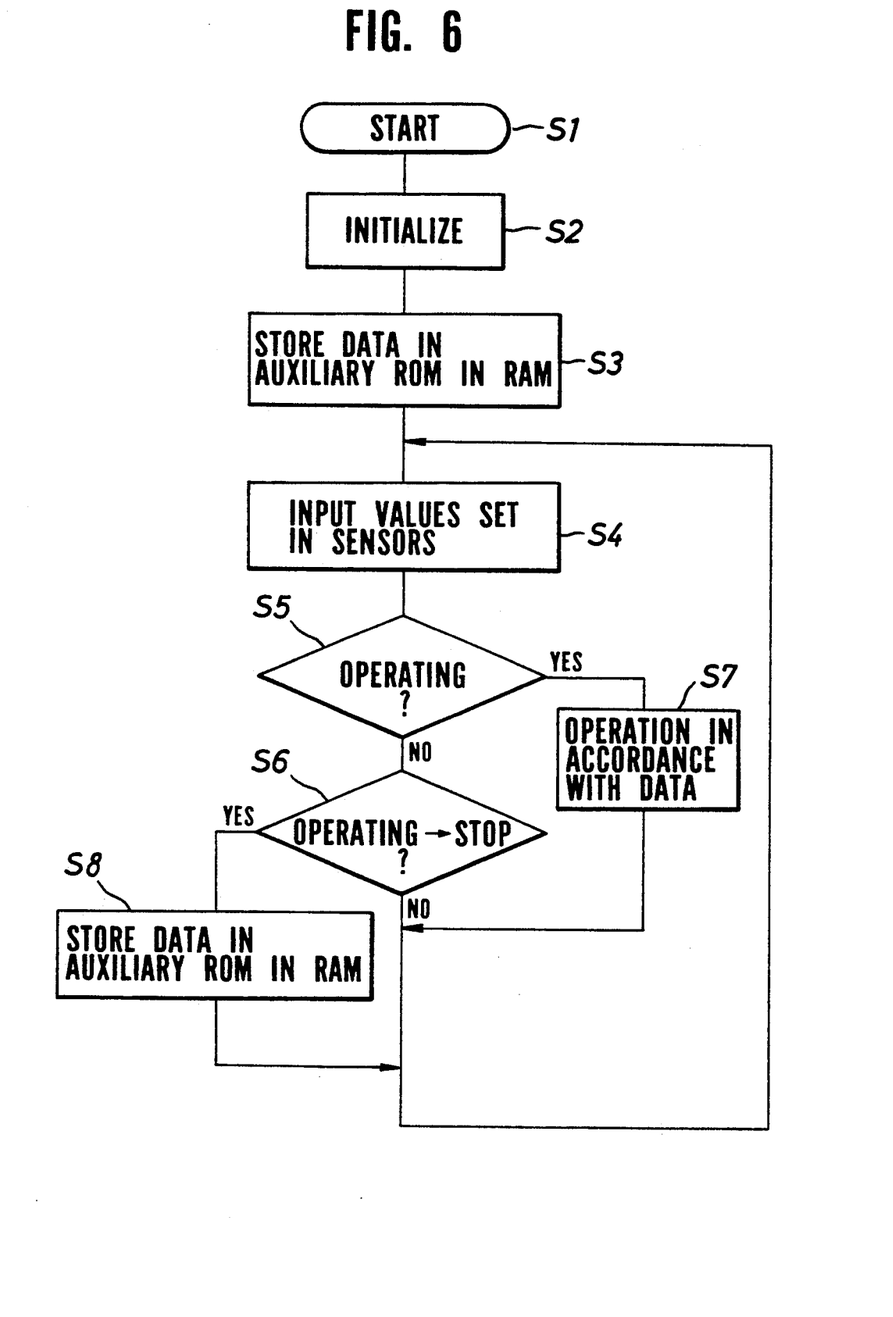
FIG. 6 is a flow chart showing the main operation of a microprocessor shown in FIG. 3.

FIG. 6 is a flow chart showing the major operation of the microcomputer 14.

Referring to FIG. 6, when the plug 10 is connected to the electric outlet in step S1 to start power supply, the microcomputer 14 is initialized in step S2. Subsequently, data stored in the auxiliary ROM 30 is read out and stored in the RAM in the microcomputer 14 in step S3. As described above, this process corresponds to supplying the reset signal to the auxiliary ROM 30, thereafter outputting pulses at predetermined cycles, fetching data corresponding to the pulse outputs through the port P44, and sequentially storing the data in the RAM.

The flow advances to step S4 to input detection outputs of the sensors 20 to 22 and 105 and store the corresponding data in the RAM. Similarly, the contact contacting the slider 17a is discriminated from the voltage applied to the port P47, and data indicating the terminal contacting the slider 17a is stored in the RAM. When a signal (operation data) from the remote controller 60 is input, the reception signal is supplied to the port P42 to interrupt the program, and a series of received operation data are divided into respective data groups and stored in the RAM.

Whether the air conditioner is operating is discriminated in step S5, and whether the operation of the air conditioner is stopped is discriminated in step S6. If Yes in step S5, the flow advances to step S7 to perform operation in accordance with the data stored in the RAM. For example, when the slider 17a contacts an operation contact $C_2$ and thus the heating operation is performed, a lamp indicating heating is turned on, and the operation of the compressor is controlled on the basis of the room temperature and the preset temperature (for example, data setting the operating capability of the compressor is supplied to the outdoor unit).

The microcomputer 41 of the outdoor unit 2 has almost the same function as described above, and a detailed description thereof will be omitted.

In the air conditioner having the arrangement as described above, for example, in a type A, a corresponding remote controller is a type "VR", a cooling-/heating function is provided, no electric heater or humidity sensor is provided, the capacity of the unit is 2500 Kcal, and the like. In a type B, a corresponding remote controller is a type "VS" (capable of transmitting operation data of a larger number of functions than VR to perform a larger number of functions of the air conditioner), a cooling/heating function is provided, an electric heater and a humidity sensor are provided, the capacity of the unit is 2800 Kcal, and the like. Similarly, types C and D and the like are available.

The differences among these types are the numbers of main functions, the capacities of the units ranging from 2000, 2500, 2800 and to 3200 Kcal, and the like. Accordingly, the number of types corresponds to the number of combinations of these characteristics. If a function to be set is selected and the operating capacity of the compressor to be demanded on the outdoor unit is changed in accordance with the capability of the indoor unit, a plurality of types of air conditioners can be controlled by one control device. That is, the control device for the present invention ca control different types of air conditioners by setting the specific data to be stored in the auxiliary ROMs in accordance with the respective types.

In the above embodiment, auxiliary ROMs storing specific data may be prepared in units of different types, and appropriate auxiliary ROMs may be mounted in the control device in accordance with the types of the air conditioners in which the control device is to be incorporated. Also, in the above embodiment, an OTPROM (one time programmable read only memory) is used as the auxiliary ROM. However, the present invention is not limited to this and an E$^2$PROM may be used as the auxiliary ROM. In this case, the E$^2$PROM may be used in the same manner as the OTPROM, or the E$^2$PROM may be mounted in the control device in advance and thereafter specific data may be stored in the E$^2$PROM.

Furthermore, a RAM can be used in place of the auxiliary ROM by providing a backup power supply.

According to the present invention, since a memory element storing the specific data concerning characteristics and functions which are inherent in a corresponding type is incorporated in the control circuit of the air conditioner, other control circuit portions can be manufactured as a board common to other types to improve cost and performance. Furthermore, the characteristics and functions of the air, conditioner can be easily changed at any time only by exchanging the memory element storing the specific data or by updating the specific data.

What is claimed is:

1. In an air conditioner having a refrigeration cycle in which a compressor, an outdoor heat exchanger, an expansion valve, and an indoor heat exchanger are connected by a refrigerant pipe, for supplying air which is temperature-controlled by said indoor heat exchanger to a room to be air-conditioned by controlling components, such as said compressor and a blower, a control device for controlling said components of said air conditioner, a controlling means for controlling the operation capacity of said compressor so as not to exceed a predetermined maximum capacity for the compressor on the basis of a signal from said control device;

said outdoor heat exchanger and said indoor heat exchanger having such capacities as to continue operation at the time of operation of said compressor even with a maximum capacity, said control device comprising, a microcomputer housing in one package a first ROM for storing a program controlling the operation of said components and said controlling means, a RAM for storing present data and various data associated with operation, and a CPU for executing said program; and a second ROM for storing specific data representing at least the maximum capacity of said compressor and the capacity of said outdoor or indoor heat exchanger and for sequentially outputting said stored specific data to said microcomputer in response to an output from said microcomputer, said second ROM being electrically connected to said microcomputer;

wherein said CPU stores said specific data output from said second ROM in accordance with said program into said RAM every time the air conditioner stops operation thereof and the operation capacity of the compressor is controlled below a predetermined maximum capacity and the capacity of the compressor is controlled on the basis of a room temperature and set temperature and on the basis of said data stored in said RAM .

2. A control device according to claim 1, wherein said second ROM is a one time programmable sequential read only memory in which said specific data are written in advance.

3. A control device according to claim 1 wherein said second ROM further stores specific data for determining capacity of the air conditioner.

4. In an air conditioner of separate type comprising an indoor unit having an expansion valve and an indoor heat exchanger and an outdoor unit having a compressor and an outdoor heat exchanger, said outdoor unit including:

a controlling means for controlling the operation capacity of said compressor so as not to exceed a predetermined maximum capacity for the compressor on the basis of a signal from said control device;

said outdoor heat exchanger and said indoor heat exchanger having such capacities as to continue operation at the time of operation of said compressor even with a maximum capacity, said control device comprising:

a microcomputer housing in one package a first ROM for storing a program for controlling operations of said components and said controlling means, a RAM for storing present data and various data associated with operation, and a CPU for executing said program; and a second ROM for storing specific data representing at least the maximum capacity of said compressor and the capacity of said outdoor and indoor heat exchanger and for sequentially outputting said stored specific data to said microcomputer in response to an output from said microcomputer, said second ROM being electrically connected to said microcomputer;

wherein said CPU stores said specific data output from said second ROM in accordance with said program into said RAM every time the air conditioner stops operation thereof and the operation capacity of the compressor is controlled below a predetermined maximum capacity and the capacity of the compressor is controlled on the basis of a room temperature and set temperature and on the basis of said data stored in said RAM.

5. A control device according to claim 4 wherein the second ROM of said indoor unit further includes a specific data representing at least capacity of said indoor heat exchanger and said second ROM of the outdoor unit further includes a specific data representing at least capacity of said compressor.

6. A controller for a combined heating/air conditioning installation, said controller having a microcomputer with a memory for storing a set of program instructions defining a mode of operation for said controller, and for storing data relating to existing conditions, and for storing data relating to selected parameters of said combined heating/air conditioning installations, said parameters including the maximum operating capacity of various components of said installation so that said controller may thereby be used with different heating/air conditioning installations, said microcomputer having means for receiving and storing a desired value for an environmental condition and means for running said program instructions to achieve said desired value.

7. The controller of claim 6 wherein said heating/air conditioning installation includes a first group of equipment for location outdoors of a space whose environment is sought to be controlled by said heating air/conditioning installation, and a second group of equipment for location inside said space, said controller including a first microcomputer connected to said first group of equipment and a second microcomputer connected to said second group of equipment, and a data link connecting said first microcomputer to said second microcomputer so that said microcomputers may together coordinate the operation of both said first and second groups of equipment to achieve said desired value.

8. The controller of claim 7 wherein said second group of equipment includes devices for sensing the existing values of said environmental conditions desired to be monitored and controlled.

9. The controller of claim 8 wherein each of said microcomputers has a memory for storing said data.

10. The controller of claim 9 further comprising means for changing said data stored in each memory to thereby facilitate each of said microcomputer's use with different equipment.

11. The controller of claim 10 wherein one of said microcomputers acts as a master by sending data over said data link to said other microcomputer, said other microcomputer acting as a slave by responding to said data to control its associated group of equipment in response to said data.

12. The controller of claim 11 wherein said second microcomputer is said master and said first microcomputer is said slave.

13. The controller of claim 12 further comprising means for an operator to input said desired values for said environmental conditions to said master microcomputer.

14. The controller of claim 13 wherein said input means comprises a remote control.

15. A controller for a combined heating/air conditioning installation, said installation including a first group of equipment for location outdoors of a space whose environment is sought to be controlled, and a second group of equipment for location inside said space, said controller including a first microcomputer connected to said first group of equipment for controlling said first group of equipment, a second microcomputer connected to said second group of equipment for controlling said second group of equipment, said second group of equipment including a plurality of sensors for sensing the instantaneous values of a plurality of environmental conditions, said sensors being connected to said second microcomputer for inputting data corresponding to said sensed instantaneous values, each of said microcomputers having a memory for storing data corresponding to its associated equipment parameters, data corresponding to the sensed instantaneous values of said environmental conditions, and a program for controlling the operation of said microcomputer, and a data link interconnecting said first and second microcomputers so that said microcomputers may communicate data to each other.

16. The controller of claim 15 wherein one of said microcomputers acts as a master by sending data over said data link to said other microcomputer, said other microcomputer acting as a slave by responding to said data to control its associated group of equipment in response to said data.

17. The controller of claim 16 wherein said second microcomputer is said master and said first microcomputer is said slave.

18. The controller of claim 17 further comprising means for an operature to input said desired values for said environmental conditions to said master microcomputer.

19. The controller of claim 18 wherein said input means comprises a remote control.

* * * * *